(12) United States Patent
Katers

(10) Patent No.: US 8,544,421 B2
(45) Date of Patent: Oct. 1, 2013

(54) ANIMAL CONTROL POLE

(75) Inventor: Andrew Katers, Boulder, CO (US)

(73) Assignee: Animal Care Equipment & Services, LLC, Boulder, CO (US)

( * ) Notice: Subject to any disclaimer, the term of this patent is extended or adjusted under 35 U.S.C. 154(b) by 120 days.

(21) Appl. No.: 13/108,932

(22) Filed: May 16, 2011

(65) Prior Publication Data

US 2012/0012072 A1 Jan. 19, 2012

Related U.S. Application Data

(60) Provisional application No. 61/334,875, filed on May 14, 2010.

(51) Int. Cl.
*A01K 15/04* (2006.01)

(52) U.S. Cl.
USPC ............ 119/803; 119/801; 119/802; 119/712

(58) Field of Classification Search
USPC ................ 119/801–808, 717, 769, 712, 755, 119/756, 772, 778, 864; 43/5, 86, 87
See application file for complete search history.

(56) References Cited

U.S. PATENT DOCUMENTS

| | | | | | |
|---|---|---|---|---|---|
| 511,148 | A | * | 12/1893 | Jones | 119/804 |
| 873,514 | A | * | 12/1907 | Davis | 119/804 |
| 2,616,123 | A | * | 11/1952 | Armstrong | 452/63 |
| 2,704,052 | A | * | 3/1955 | Wood | 119/804 |
| 3,292,591 | A | * | 12/1966 | Wood | 119/804 |
| 3,319,609 | A | * | 5/1967 | Pickard et al. | 119/804 |
| 3,402,959 | A | * | 9/1968 | Harris | 294/119.2 |
| 3,588,161 | A | * | 6/1971 | Sayre et al. | 294/74 |
| 3,949,514 | A | * | 4/1976 | Ramsey | 43/87 |

FOREIGN PATENT DOCUMENTS

FR   2555020   *   5/1985

* cited by examiner

*Primary Examiner* — Andrea Valenti
(74) *Attorney, Agent, or Firm* — Holland & Hart LLP

(57) ABSTRACT

An animal control pole has a first end adapted to be held by a user, and a second end adapted to ensnare and assist in the control of an animal. The pole has an axial bore extending therethrough and a cable that extends through the axial bore and extends from each end of the pole. A retaining element is located at the second end of the pole and retains the free end of the cable that extends from the second end, so as to form a closed animal engageable adjustable loop. The animal control pole includes dual release mechanisms. A first release mechanism releases the free end of the cable that extends through the second end of the pole. A second release mechanism forces an additional length of cable through the axial bore of the second end and thereby increases the size of the loop.

13 Claims, 12 Drawing Sheets

ANIMAL CONTROL POLE

CROSS-REFERENCE TO RELATED APPLICATIONS

This application claims priority to U.S. Provisional Patent Application No. 61/334,875, filed on May 14, 2010, and entitled "ANIMAL CONTROL POLE," the entire disclosure of which is incorporated herein by reference.

FIELD

The present application is directed to animal handling equipment, and, more specifically, to an animal control pole having dual release mechanisms.

BACKGROUND

Equipment for use in handling of animals is well known. Such equipment is used to facilitate the capture and handling of many types of animals, such as stray animals. Stray animals can include various breeds of household pets, working dogs or the like. Animal handling equipment may also be used in the capture and handling of wild animals that have made an incursion into locations where their presence is not desirable, such as residential areas. Regardless of whether an animal is a domesticated companion animal, or a wild animal, a basic problem exists in the capture and handling of the animal in that such animals can become apprehensive and resistant to any attempts to catch and restrain or otherwise handle them. Many animals, when approached by an unknown or untrusted person desiring to catch and restrain the freedom of the animal, resist such approaches and may present a danger of injuring to the person or persons attempting to restrain the animal.

It should be noted that whilst the term stray has been used, it is intended to relate to animals that may not be strays in the literal sense of the word, but also includes animals that show signs of resisting human approach and handling. For example, a veterinarian clinic or other animal health facility may have an animal for treatment purposes that may resist handling by an unknown person.

SUMMARY

The present disclosure provides an animal control pole, also referred to as a snare pole, that includes a pole with a first end adapted to be held by a user, and a second end adapted to ensnare and assist in the control of an animal. The pole has an axial bore extending therethrough and a cable that extends through the axial bore. The cable is longer in length than the pole, and extends from each end of the pole. A retaining element is located at the second end of the pole and retains the free end of the cable that extends from the second end, so as to form a closed animal engageable loop. A latching mechanism is adjacent to the first end that allows control over the size of the loop. The animal control pole includes dual release mechanisms. A first release mechanism disengages the retaining element and thereby releases the free end of the cable that extends through the second end of the pole. A second release mechanism includes a spring loaded cable feed that, when actuated, forces an additional length of cable through the axial bore of the second end and thereby increases the size of the loop.

The latching mechanism allows a user to insert or withdraw the cable into/from the first end of the pole to allow increase/decrease in the size of the loop. The latching mechanism incorporates a lock that prevents cable movement relative to the pole. The lock may also be engaged to allow cable movement in a first direction but not the opposite.

The free end of the cable includes an eyelet that is engageable with a pin that is axially displaceable in the retaining element to engage/disengage the free end of the cable. The pin may be resiliently loaded into an engaged position, and is coupled to the first release mechanism to move into the disengaged position. The first release mechanism is located at a location in a medial portion of the pole, adjacent to a medially located hand grip.

The cable includes two separate portions, a head end portion that extends through the second end of the pole, and a tail end portion that extends through the first end of the pole. The head end and the tail end are joined together through a standard threaded connection located within the axial bore of the pole. Two portions of the cable allow for the replacement of only a single portion of the cable, rather than requiring replacement of the entire cable in the event that the cable requires replacement. The connection of the two cable portions may also be configured to engage with a spring or other resilient forcing member and the second release mechanism. When the second release mechanism is actuated, the spring is released and exerts force against the connection point to force additional cable through the second end of the pole and thereby increase the size of the loop. The second release mechanism may be located adjacent the first end of the pole, adjacent to a hand grip at the first end.

DETAILED DESCRIPTION

Figure 1:
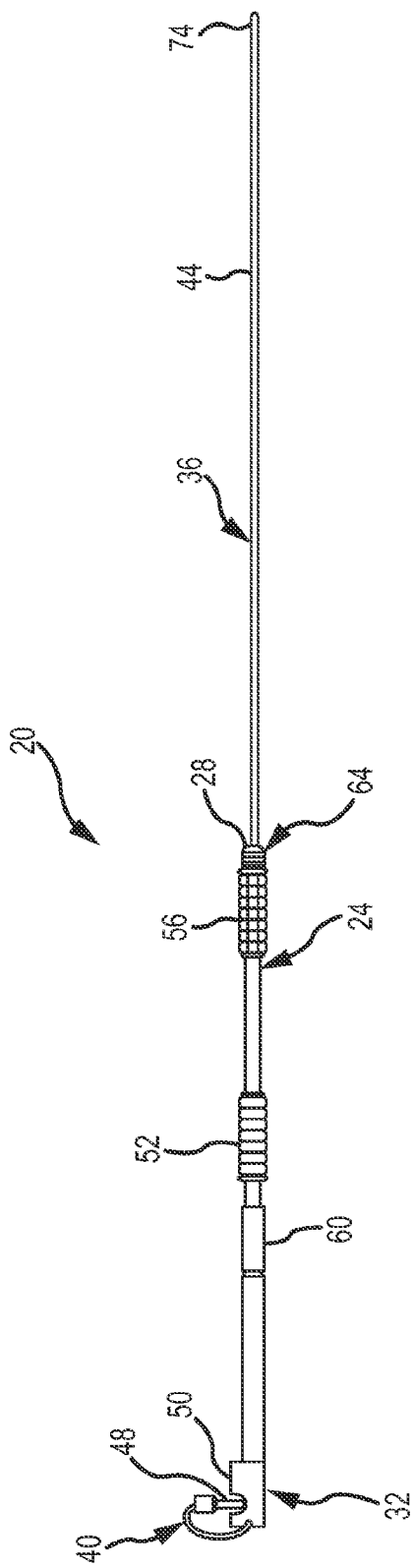
FIG. 1 is an illustration of an animal control pole according to an embodiment of the present disclosure.

With reference now to the drawings, animal capture poles of various embodiments are now described. As discussed above, animal capture poles, also referred to as snare poles, may be used to facilitate the safe handling of domesticated or wild animals. The present disclosure recognizes that when animals are in unfamiliar situations or are attempted to be handled by unknown or untrusted individuals, the animals may become defensive and try to strike or bite a handler. Animal capture poles along with other types of animal restraint and handling equipment, are commonly used to reduce the likelihood of an animal being injured, as well as to reduce the likelihood of a handler being injured by an animal. For example, a city or municipality may employ animal control personnel to capture animals that have run away or otherwise escaped from their homes, such as companion animals that have escaped from the residence where they are kept. These animal control personnel may also be called upon to capture wild animals that have wandered into residential areas and may pose a threat to people or animals in these areas. In any case, the animal control personnel generally desire to capture and handle the animal in a manner in which the animal and handler are not injured. In cases where the animal control personnel are using a snare pole, the animal may be captured in the loop end of the pole and handled at a safe distance by the handler and moved into an appropriate location, such as a kennel, pen or cage. When the animal is moved into the desired location, the animal is released from the snare pole. Traditional snare poles may employ release mechanisms that disengage an end of the loop, thus freeing the animal. The loop of such a pole may also be enlarged to allow the loop to pass back over the animal's head and thereby release the animal. The particular release method largely depends upon the particular situation and animal. However, traditional snare poles do not generally allow for efficient release of an animal by a method that is selected by the user of the pole. In order to provide a handler with different release options for an animal, embodiments of the present disclosure provide multiple release mechanisms that may be selected based on a particular situation.

Furthermore, the present disclosure recognizes that cables used in snare poles are commonly damaged during use, such as through an animal chewing or biting a cable. Such damaged cables are required to be repaired or replaced, which is often a time consuming process. Additionally, replacement of cables used in such poles can be a significant expense. In many traditional snare poles, a relatively small cable is used, which can be harsher on an animal than a larger diameter cable. The present disclosure recognizes that larger diameter cables are gentler on animals, but can be significantly more expensive to replace. In order to help provide a cable that is gentler on the animal, and also provide a less expensive replacement of animal damaged cables, embodiments described herein provide a two-part cable, with each part being separately replaceable.

With reference now to the drawings, an animal capture pole of an embodiment is now described. As illustrated in FIG. 1, an animal capture pole 20 may be used to assist in the capture and handling of animals. The animal capture pole 20 of this embodiment includes a tube body 24 that includes a first end 28 and a second end 32. A cable 36 extends through an axial bore of the tube body 24 and forms a loop at a head end 40 of the cable 36, at the second end 32 of the animal capture pole 20. A tail end 44 of the cable extends from the first end 28 of the animal capture pole. The head end 40 of the cable 36 includes an eyelet 48 which engages with a release mechanism 50 located at the second end 32. Hand grips 52, 56 are located on the tube body 24 to facilitate the gripping and handling of the animal capture pole 20 by a user. The hand grip 52 is located at a medial section of the tube body 24, and hand grip 56 is located adjacent to the first end 28 of the tube body.

The animal capture pole of this embodiment includes dual release mechanisms. A first release mechanism releases the head end of the cable 40 from the second end 32 thereby breaking the loop to release the animal. This first release mechanism is actuated by pulling a release member 60 which disengages a pin in the first release mechanism 50 whereby allowing the eyelet 48 of the head end of the cable. A second release mechanism is actuated by a second release handle 64 that is located adjacent to the first end 28 of the tube body 24. The handle 64 when pulled in an axial direction from the tube body 24 disengages a release mechanism that is spring loaded to feed additional slack of the cable 36 to the second end 32 of the tube body. This thereby increases the size of the loop formed at the head end 40 of the cable and allows a handler to remove the loop over an animal's head.

Figure 2:
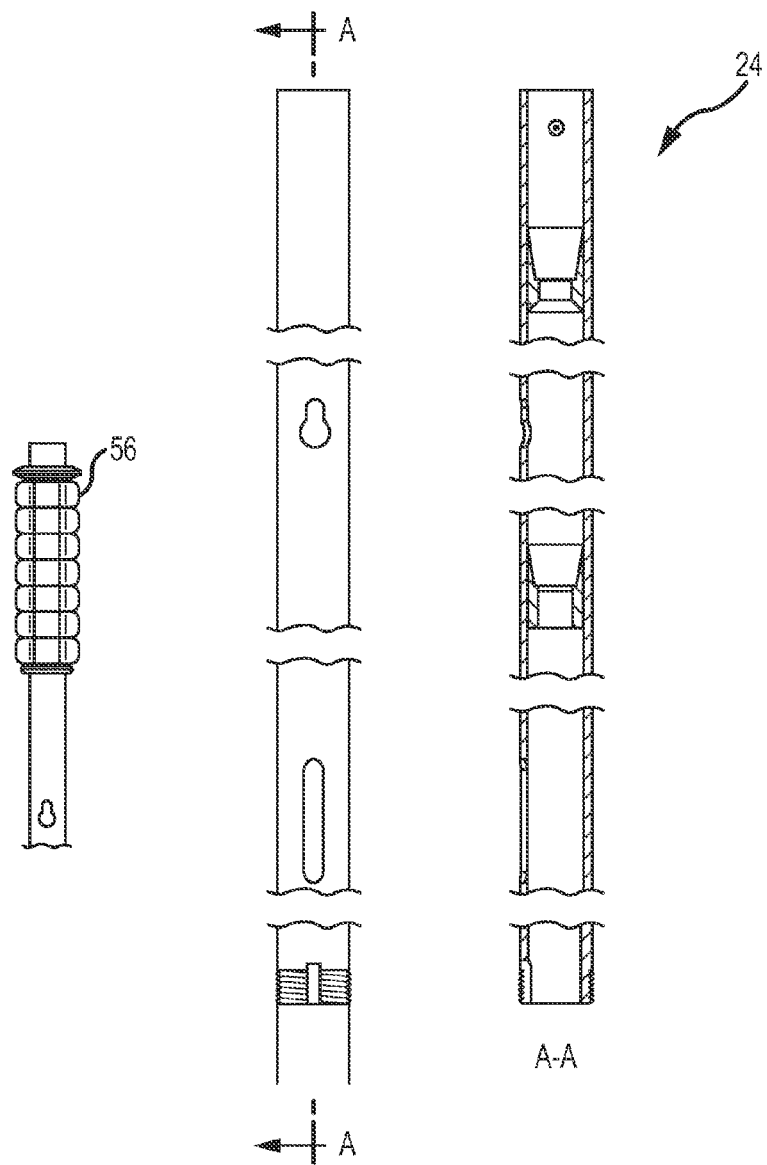
FIG. 2, is an illustration, partially in cross section, of an end of an exemplary animal control pole.
Figure 3:
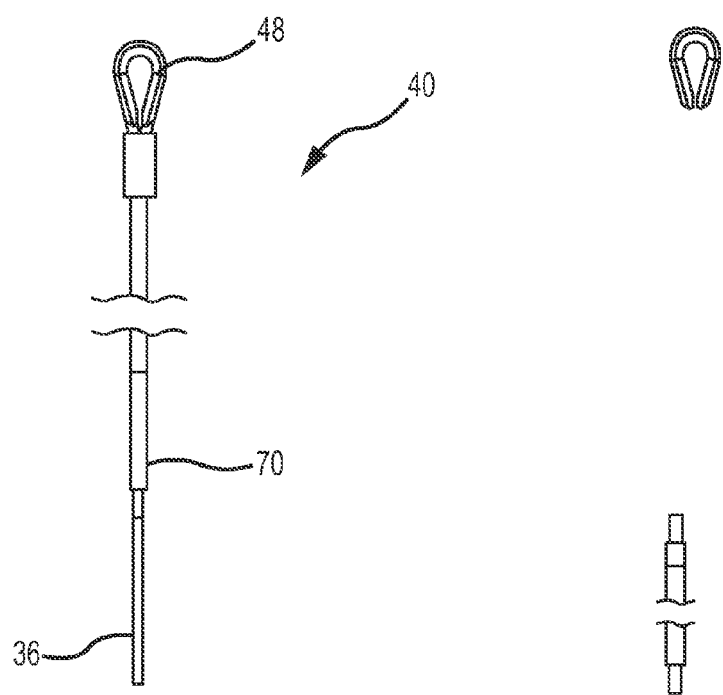
FIG. 3 is an illustration of an exemplary cable used in an animal control pole.
Figure 4:
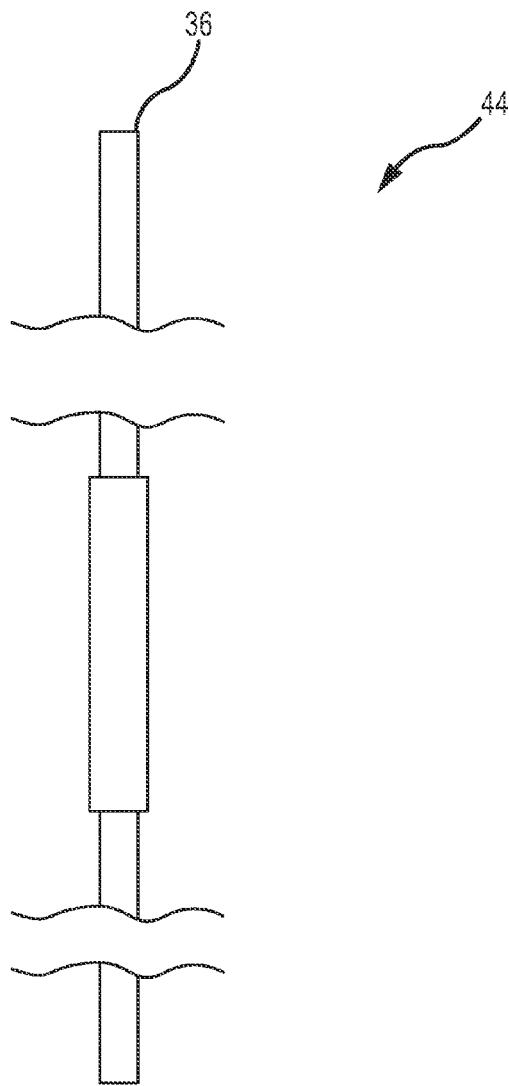
FIG. 4 is an illustration of a cable end of an exemplary embodiment.
Figure 5:
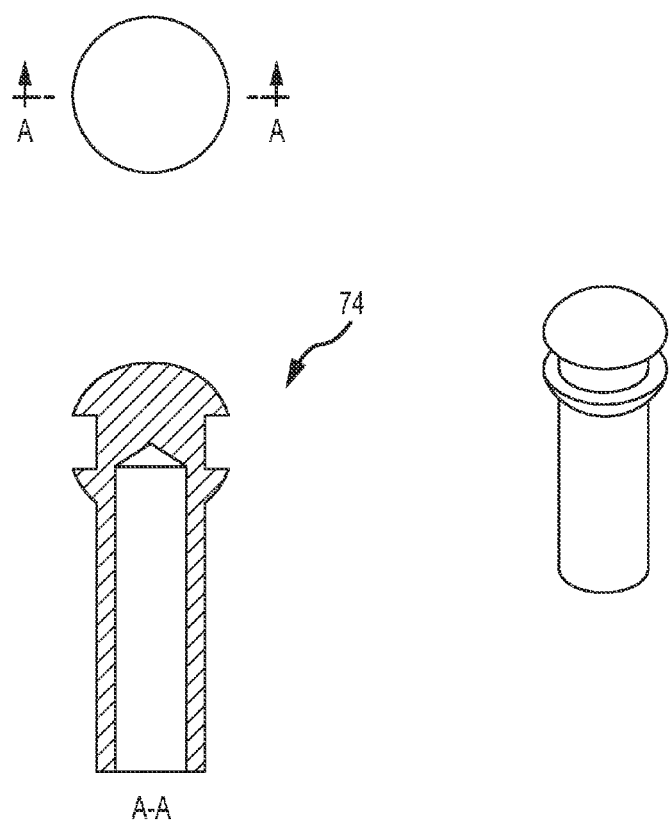
FIG. 5 is an illustration of a cable end cap of an exemplary embodiment.
Figure 6:
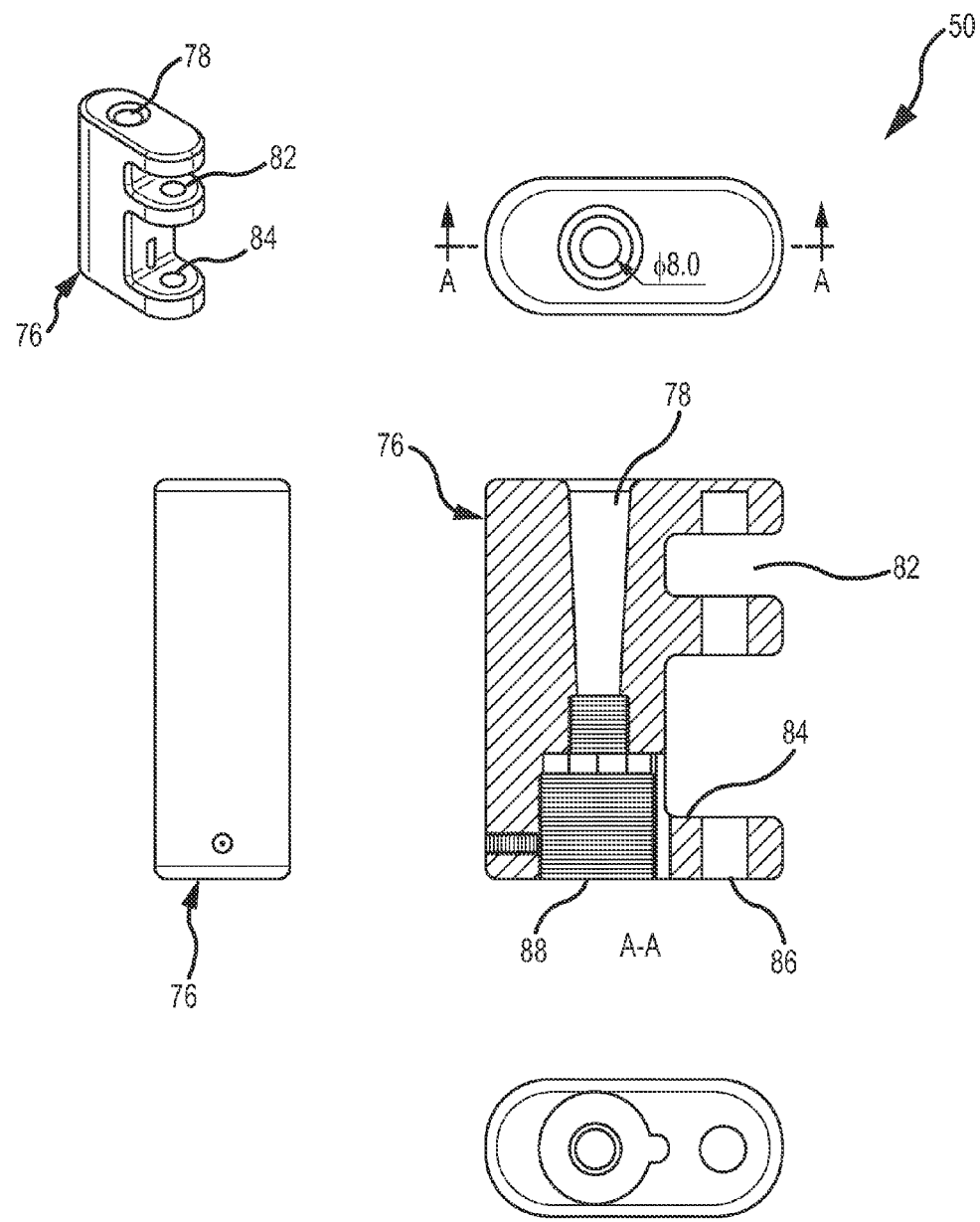
FIG. 6 is an illustration of a release mechanism according to an exemplary embodiment.
Figure 7:
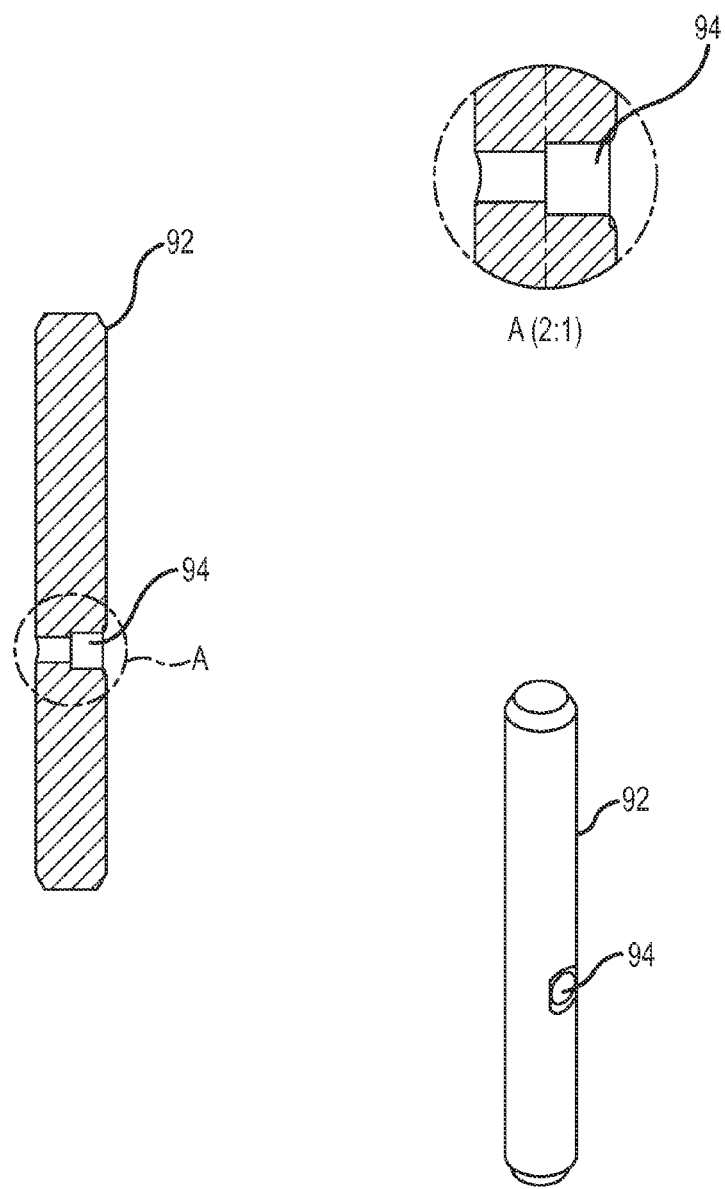
FIG. 7 is an illustration of an exemplary release pin.
Figure 8:
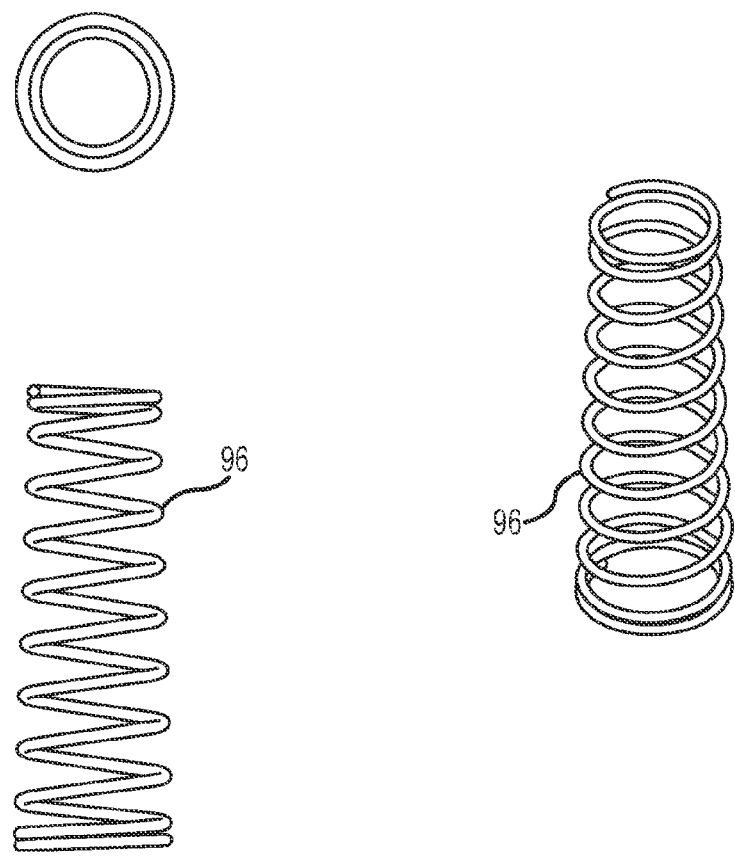
FIG. 8 is an illustration of an exemplary biasing member used in a release mechanism according to an embodiment.
Figure 9:
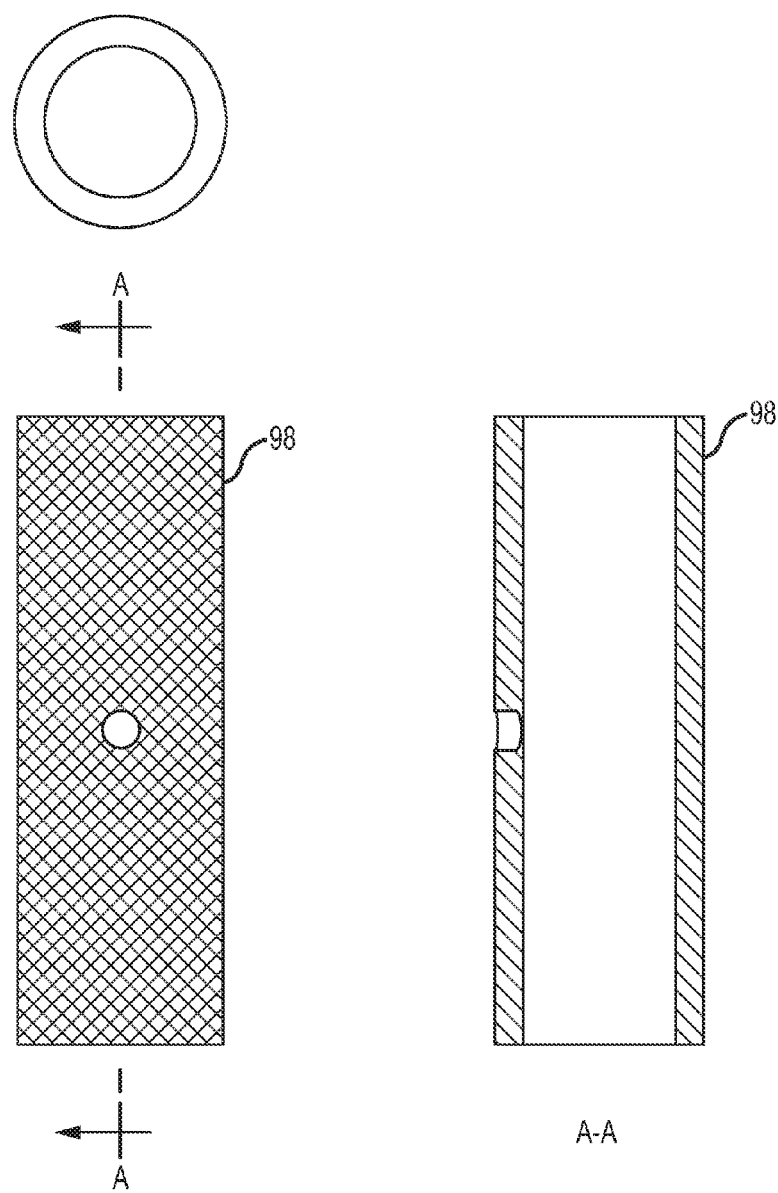
FIG. 9 is an illustration of an exemplary release grip.

With reference now to FIG. 2, a detailed illustration of the tube body 24 is illustrated. The tube body 24 of this embodiment is a hollow tube having an axial bore therethrough into which the cable 36 may be routed. The cable 36, as mentioned, includes a head end 40 and a tail end 44. The head end 40 is illustrated in FIG. 3 for an embodiment. In this embodiment, the head end 40 includes an eyelet 48 at a distal end thereof, which may engage with the first release mechanism 50. The head end 40 in this embodiment also includes a plastic coating 70 which serves to increase the overall diameter of the head end 40 thereby allowing gentler handling of an animal, and also providing protection to the cable 36 from biting or chewing by an animal. FIG. 4 illustrates a tail end of the cable 36 of an embodiment. In this embodiment, the tail end of the cable is connected to the head end by a connection point located within the axial bore of tube body 24. The cable wire termination cap 74, illustrated in FIG. 5, is attached to the distal end of the tail end 44 of the cable 36, and allows for more efficient handling by a user and also prevents the end of the cable 36 from traveling into the tube body 24.

As mentioned above, a first release mechanism 50 may be used to release the eyelet 48 of the head end 40 from the second end 32 of the tube body 24. This allows the loop to be broken and thereby release an animal that is being handled with the assistance of the animal capture pole 20. With reference now to FIGS. 6-9, the first release mechanism 50 of an embodiment is described. In this embodiment, the first release mechanism 50 includes a body member 76 having an axial bore 78 and an opening 82 which may receive the loop 48 of the head end 40. The body 76 also includes an opening 84 and aperture 86 through which a release pin 92 may be inserted. The body member 76 also includes an aperture 88 which is threaded and sized to engage with the second end 32 of the tube body 24. The release pin 92 includes an opening 94 through which a pin or bolt may be inserted so as to secure a spring 96 between the location of the pin or bolt and a bottom shelf 84 of the body member 76. This spring 96 acts to bias the release pin in a closed position extending through the opening 82 so as to engage with the eyelet 48 on the head end 40 of the cable 36. A release grip 98 is located adjacent to the grip 52 and may be actuated by a user. In operation, the release grip 98 is coupled to the release pin 92, and when a user pulls the release grip 98 towards the grip 52, the release pin 92 is pulled down through the body member 76, thereby allowing the eyelet 48 to come free from the body member 76 and release pin 92. The release grip 98 and release pin 92 may be connected, for example, by a mechanical linkage such as a wire or rod that is secured to both the release grip 98 and release pin 92, and is routed through the inside of the tube body 24.

Figure 10:
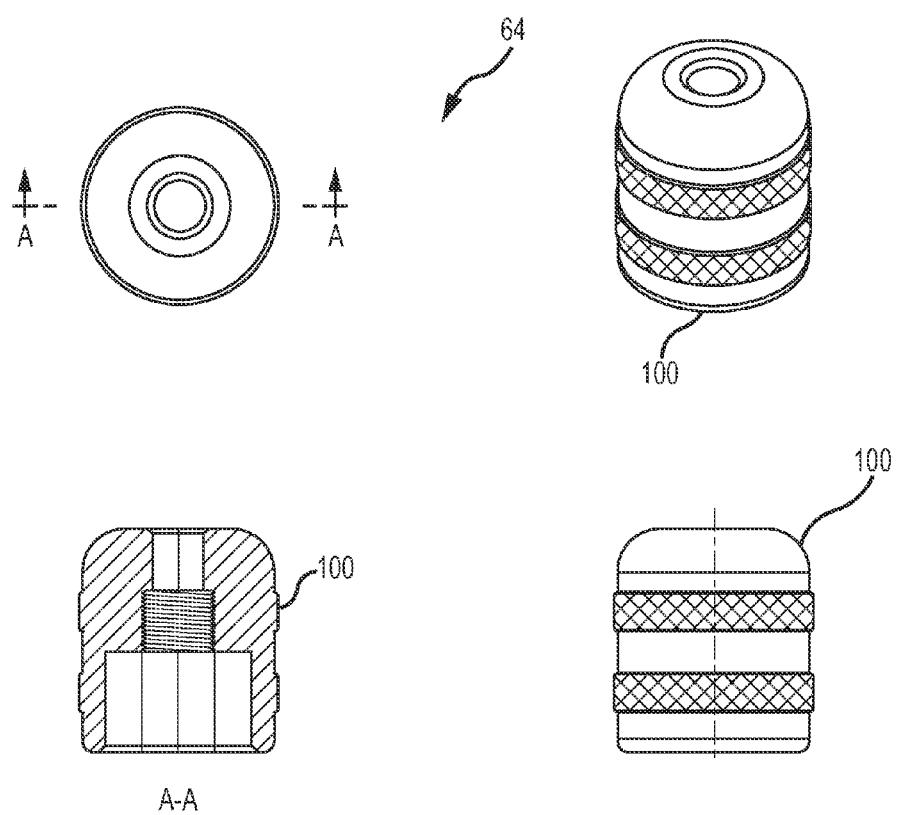
FIG. 10 is an illustration of a knurled knob according to an embodiment.

As also mentioned above, a second release mechanism 64 is included in various embodiments which allows a quick release through increasing the size of the loop 40 at the head end of the cable 36. The second release mechanism, in an embodiment, is described now with respect to FIGS. 10-12. In this embodiment, a release knob 100 is located at the first end 28 of the tube body 24. Secured to release knob 100 is an inner sleeve located within the axial bore of the tube body 24. The inner sleeve is positioned within a conical or wedge shaped portion of the axial bore such that when the release knob 100 is pulled away from the first end 28, the inner sleeve travels from a narrower portion to of the axial bore to a wider portion of the axial bore. In this embodiment, ball bearings are positioned within detents of the inner sleeve, and when the release knob 100 is moved toward the first end 28, the ball bearings move along the conical or wedge shaped portion of the axial bore. The cable 36 is routed through the inner sleeve, and when the sleeve and ball bearings move up the conical or wedge shaped portion of the axial bore, the cable 36 is wedged between the ball bearings thereby securing the cable 36 within the tube body 24 to prevent the cable 36 from moving in an axial direction within the axial bore. In one embodiment, a spring is secured to the tube body 24 and the inner sleeve, to bias the inner sleeve in a position to secure the cable 36 within the tube body 24. When a user pulls the release knob 100 away from the first end 28, the force of this bias is overcome and the inner sleeve moves along the conical or wedge shaped portion of the axial bore, thereby allowing the ball bearings to move apart from one another and allow the cable to move through the axial bore. This mechanism also allows a user to pull the tail end 44 of the cable 36, which will act to move the ball bearings down the conical or wedge shaped portion and allow the cable 36 to be pulled through the axial bore in a direction to reduce the loop size at the second end 32, but not allow the cable 36 to move in the opposite direction.

Figure 11:
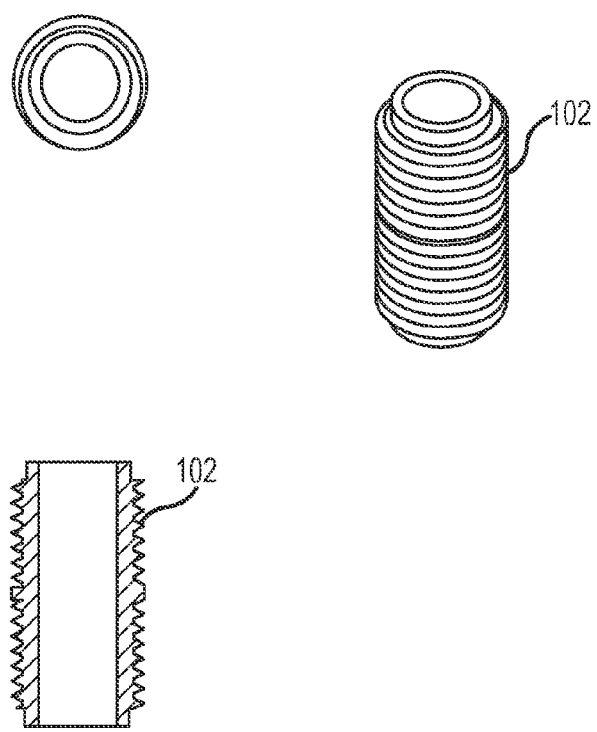
FIG. 11 is an illustration of a threaded connector for a cable of an exemplary embodiment.
Figure 12:
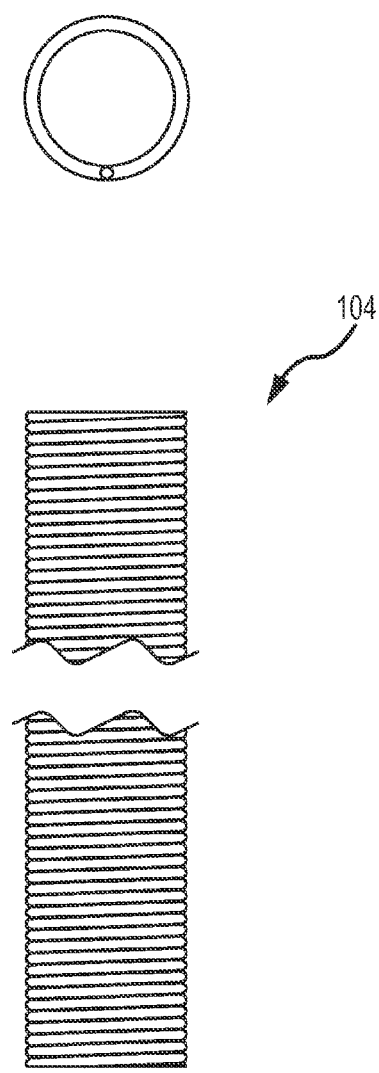
FIG. 12 is an illustration of a biasing member of an exemplary embodiment.

In one embodiment, the second release mechanism 64 further includes an automatic cable extension mechanism that forces the cable 36 through the axial bore of the tube body 24 when the release knob 100 is pulled. This results in the loop at the second end 32 becoming larger in order to facilitate removing the loop over an animal's head. In this embodiment, the head end 40 and tail end 44 of cable 36 are connected through a threaded engagement and threaded nut 102 (FIG. 11). The threaded nut 102 also acts as a spring keeper and is secured to a spring 104 within the tube body 24. In this embodiment, the spring 104 is in contact with a shelf within the tube body 24. As the cable 36 is pulled through the axial bore of the tube body 24, the spring 104 becomes compressed between the bolt 102 and the shelf. When a user pulls the release knob 100, the cable 36 is allowed to move through the ball bearings, and the spring 104 becomes uncompressed and acts to force the bolt 102 toward the second end 32 of the tube body 24, thereby enlarging the loop size at the second end 32. The loop may then be moved over the animal's head and thereby release the animal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An animal control apparatus, comprising:
    a tubular pole assembly comprising a first end and a second end, the first end adapted to be held by a user and the second end adapted to ensnare and assist in the control of an animal, the tubular pole assembly comprising:
    an axial bore extending therethrough;
    a cable that extends through the axial bore, wherein the cable is longer in length than the pole, the cable having a first cable end that extends through the axial bore at the first end of the pole, and the cable having a second cable end that extends through the axial bore at the second end of the pole;
    a retaining element located at the second end of the pole that retains the second cable end, so as to form a closed animal engageable loop, wherein the second cable end includes an eyelet that is engageable with a pin that is axially displaceable in the retaining element to engage and disengage the second cable end;
    a latching mechanism adjacent to the first end of the pole that allows control over the size of the loop;
    a first release mechanism comprising a release grip located on the pole assembly between the first and second ends that is slidable along a length of the pole to disengage the retaining element and thereby releases the second cable end;
    a second release mechanism comprising a spring loaded cable feed that, when actuated, releases the latching mechanism and forces an additional length of cable through the axial bore of the second end and thereby increases the size of the loop.

2. The apparatus of claim 1, wherein latching mechanism allows a user to insert or withdraw the cable into/from the first end of the pole to allow increase/decrease in the size of the animal engagable loop.

3. The apparatus of claim 2, wherein the latching mechanism comprises a lock that, when engaged, prevents cable movement relative to the pole.

4. The apparatus of claim 3, wherein the lock, when engaged, allows the cable to move is a direction toward the first end and prevents cable movement in the direction of the second end of the pole.

5. The apparatus of claim 1, wherein the pin is resiliently biased in an engaged position, and is coupled to the first release mechanism to move into the disengaged position.

6. The apparatus of claim 1, wherein the pole assembly comprises first and second hand grips located along a length of the pole assembly, the first hand grip located proximate the first end, and the second hand grip located in a medial portion of the pole, and wherein the release grip is located adjacent to the second hand grip.

7. The apparatus of claim 1, wherein the cable comprises:
    a head end portion that extends through the second end of the pole; and
    a tail end portion that extends through the first end of the pole,
    wherein the head end and the tail end are joined together through a connection point located within the axial bore of the pole assembly.

8. The apparatus of claim 7, wherein the connection point allows the head end portion and tail end portion to be removably connected and provides for the replacement of only a single end portion of the cable.

9. The apparatus of claim 8, wherein the connection point is configured to engage with a resilient biasing member and the second release mechanism, the resilient biasing member located between the connection point and the tail end portion and biases the connection point away from the first end of the pole assembly.

10. The apparatus of claim 9, wherein when the second release mechanism is actuated, the biasing member exerts force against the connection point to force additional cable through the second end of the pole and thereby increase the size of the loop.

11. The apparatus of claim 8, wherein the connection point comprises a threaded connection.

12. The apparatus of claim 8, wherein the second release mechanism may be located adjacent the first end of the pole, adjacent to a hand grip at the first end.

13. The apparatus of claim 12, wherein the second release mechanism comprises a knurled knob located adjacent to the first end that is operably interconnected to a lock that engages with the cable and prevents cable movement relative to the pole, wherein when the knurled knob is pulled away from the first end of the pole assembly, the lock is disengaged thereby allowing the cable to move relative to the pole.

* * * * *